(12) United States Patent
Shim et al.

(10) Patent No.: US 12,520,699 B2
(45) Date of Patent: Jan. 6, 2026

(54) WINDOW AND DISPLAY DEVICE HAVING THE SAME

(71) Applicant: Samsung Display Co., Ltd., Yongin-si (KR)

(72) Inventors: Dongik Shim, Hwaseong-si (KR); Woowon Lee, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 798 days.

(21) Appl. No.: 17/591,500

(22) Filed: Feb. 2, 2022

(65) Prior Publication Data
US 2022/0263054 A1 Aug. 18, 2022

(30) Foreign Application Priority Data
Feb. 18, 2021 (KR) .................. 10-2021-0021627

(51) Int. Cl.
*H10K 59/65* (2023.01)
*G02B 5/00* (2006.01)
*H10K 59/80* (2023.01)

(52) U.S. Cl.
CPC ............ *H10K 59/65* (2023.02); *G02B 5/003* (2013.01); *H10K 59/873* (2023.02); *H10K 59/8792* (2023.02)

(58) Field of Classification Search
CPC .... H10K 50/865; H10K 50/841; H10K 59/65; H10K 59/873; H10K 59/8792; H10K 50/844; G02B 5/003; G02B 27/0006; H04M 1/0266; H04M 1/026; H04M 1/0264; H04M 2250/22; H05K 5/0018; H05K 5/03; G09F 9/301
See application file for complete search history.

(56) References Cited

U.S. PATENT DOCUMENTS

| | | | |
|---|---|---|---|
| 9,392,706 B2 | 7/2016 | Yoo et al. | |
| 10,852,861 B2 | 12/2020 | Kim et al. | |
| 2011/0226864 A1 | 9/2011 | Kim et al. | |
| 2012/0181557 A1* | 7/2012 | Kim | H01L 27/1259 438/34 |
| 2013/0242479 A1* | 9/2013 | Yoo | G01J 1/0455 361/679.01 |
| 2015/0083817 A1* | 3/2015 | Kim | G06F 3/0416 239/289 |
| 2017/0068287 A1* | 3/2017 | Jung | G02B 1/111 |

FOREIGN PATENT DOCUMENTS

| | | |
|---|---|---|
| KR | 10-2011-0105625 | 9/2011 |
| KR | 10-1866342 | 6/2018 |
| KR | 10-1919783 | 11/2018 |
| KR | 10-2019-0030243 | 3/2019 |
| KR | 10-2091355 | 3/2020 |

* cited by examiner

*Primary Examiner* — Collin X Beatty
*Assistant Examiner* — Jennifer A Jones
(74) *Attorney, Agent, or Firm* — CANTOR COLBURN LLP

(57) ABSTRACT

A window includes a window base including a first area, a second area surrounding the first area and provided with a plurality of first openings defined therein, and a third area surrounding the second area and a first nanofiber disposed under the window base and overlapping the first openings.

20 Claims, 10 Drawing Sheets

WINDOW AND DISPLAY DEVICE HAVING THE SAME

CROSS-REFERENCE TO RELATED APPLICATION

This application claims priority from and the benefit of Korean Patent Application No. 10-2021-0021627, filed on Feb. 18, 2021, which is hereby incorporated by reference for all purposes as if fully set forth herein.

BACKGROUND

Field

Embodiments of the invention relate generally to a window and a display device having the same. More particularly, the present disclosure relates to a window through which an opening is defined and a display device having the window.

Discussion of the Background

Various types of electronic devices that include a display module to provide image information are being used, and the electronic devices include an electronic module that receives an external signal or provides an output signal to the outside. As an example, the electronic module includes a camera module, and demands for a display device capable of obtaining a high-quality photographed image is increasing.

Meanwhile, a way to place the camera module in an area where the image is displayed is being studied to increase the area in which the image is displayed in the electronic device.

The above information disclosed in this Background section is only for understanding of the background of the inventive concepts, and, therefore, it may contain information that does not constitute prior art.

SUMMARY

The inventive concepts provide a window through which scent particles pass.

The inventive concepts provide a display device emitting a fragrance.

Additional features of the inventive concepts will be set forth in the description which follows, and in part will be apparent from the description, or may be learned by practice of the inventive concepts.

Embodiments of the inventive concept provide a window including a window base including a first area, a second area surrounding the first area and provided with a plurality of first openings defined therein, and a third area surrounding the second area and a first nanofiber disposed under the window base and overlapping the first openings.

The window further includes a first light blocking pattern disposed under the window base and overlapping the second area.

The first light blocking pattern overlaps only the second area.

The first light blocking pattern is disposed between the window base and the first nanofiber.

The window base further includes a fourth area surrounding the third area and a second light blocking pattern disposed under the window base and overlapping the fourth area.

The first nanofiber further includes a black matrix.

The window base further includes a fourth area surrounding the third area and provided with a plurality of second openings defined therein.

The window further includes a second nanofiber disposed under the window base and overlapping the fourth area.

The window further includes a second light blocking pattern disposed under the window base and overlapping the fourth area.

Embodiments of the inventive concept provide a window including a window base including a first area, a second area surrounding the first area, a third area surrounding the second area, and a fourth area surrounding the third area and a nanofiber disposed under the window base and overlapping at least one of the second area and the fourth area. A plurality of openings is defined in at least one of the second area and the fourth area, and the nanofiber overlaps the openings.

The window further includes a light blocking pattern disposed between the openings and the nanofiber.

The nanofiber includes a black matrix.

Embodiments of the inventive concept provide a display device including a display panel including a display area in which an image is displayed and a non-display area defined adjacent to the display area and a window disposed on the display panel. The window includes a window base including a first area, a second area surrounding the first area and provided with a plurality of first openings defined therein, and a third area surrounding the second area and a first nanofiber disposed under the window base and overlapping the first openings.

The display device further includes a first light blocking pattern disposed under the window base and overlapping the second area.

The first light blocking pattern is disposed between the window base and the first nanofiber.

The display panel is provided with a module hole defined in the display area, and the module hole overlaps at least a portion of the second area and the first area.

The display device further includes a fragrance module disposed under the window, overlapping the second area, and including scent particles.

The display device further includes an electronic module disposed under the window and overlapping the first area.

The electronic module is a camera module or an infrared ray sensor.

The window base further includes a fourth area surrounding the third area and provided with a plurality of second openings defined therein, and the window further includes a second nanofiber disposed under the window base and overlapping the fourth area.

According to the above, the scent particles pass through the window.

In addition, the display device provides a user with a scent.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

DETAILED DESCRIPTION

Figure 1:
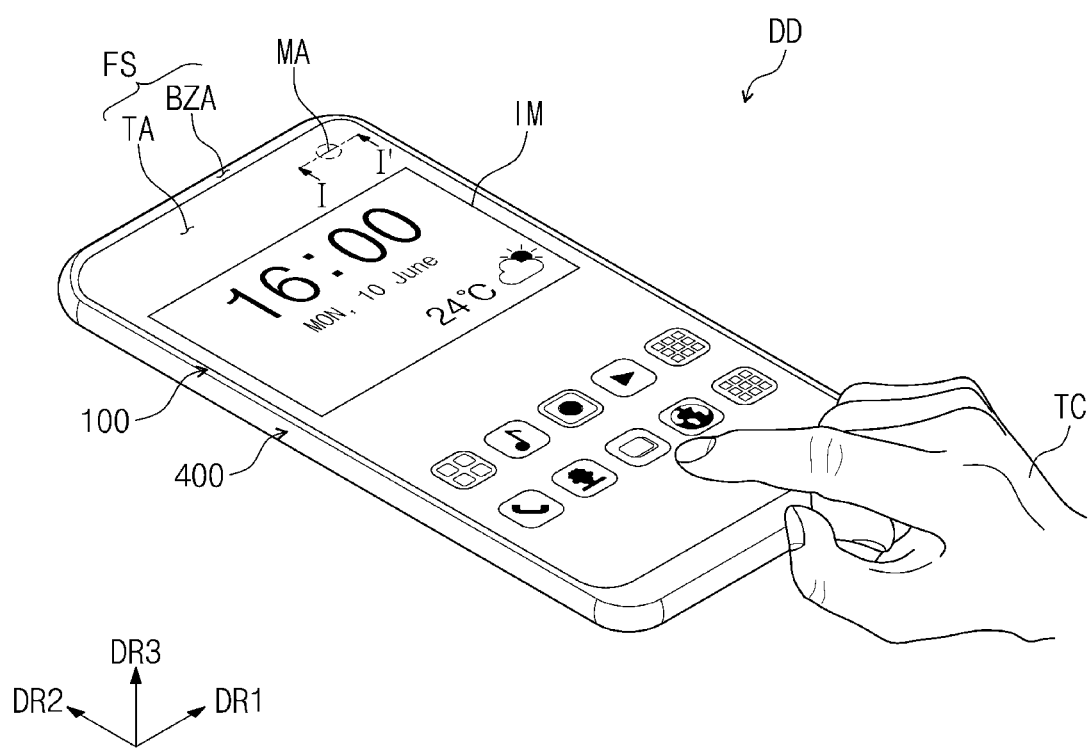
FIG. 1 is a perspective view illustrating a display device according to an embodiment of the inventive concepts.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are illustrated in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the DR1-axis, the DR2-axis, and the DR3-axis are not limited to three axes of a rectangular coordinate system, such as the x, y, and z axes, and may be interpreted in a broader sense. For example, the DR1-axis, the DR2-axis, and the DR3-axis may be perpendicular to one another, or may represent different directions that are not perpendicular to one another. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, a window 100, 100', 100-1, 100-2 and a display device DD, DD-1 will be explained in detail with reference to the accompanying drawings.

Figure 2:
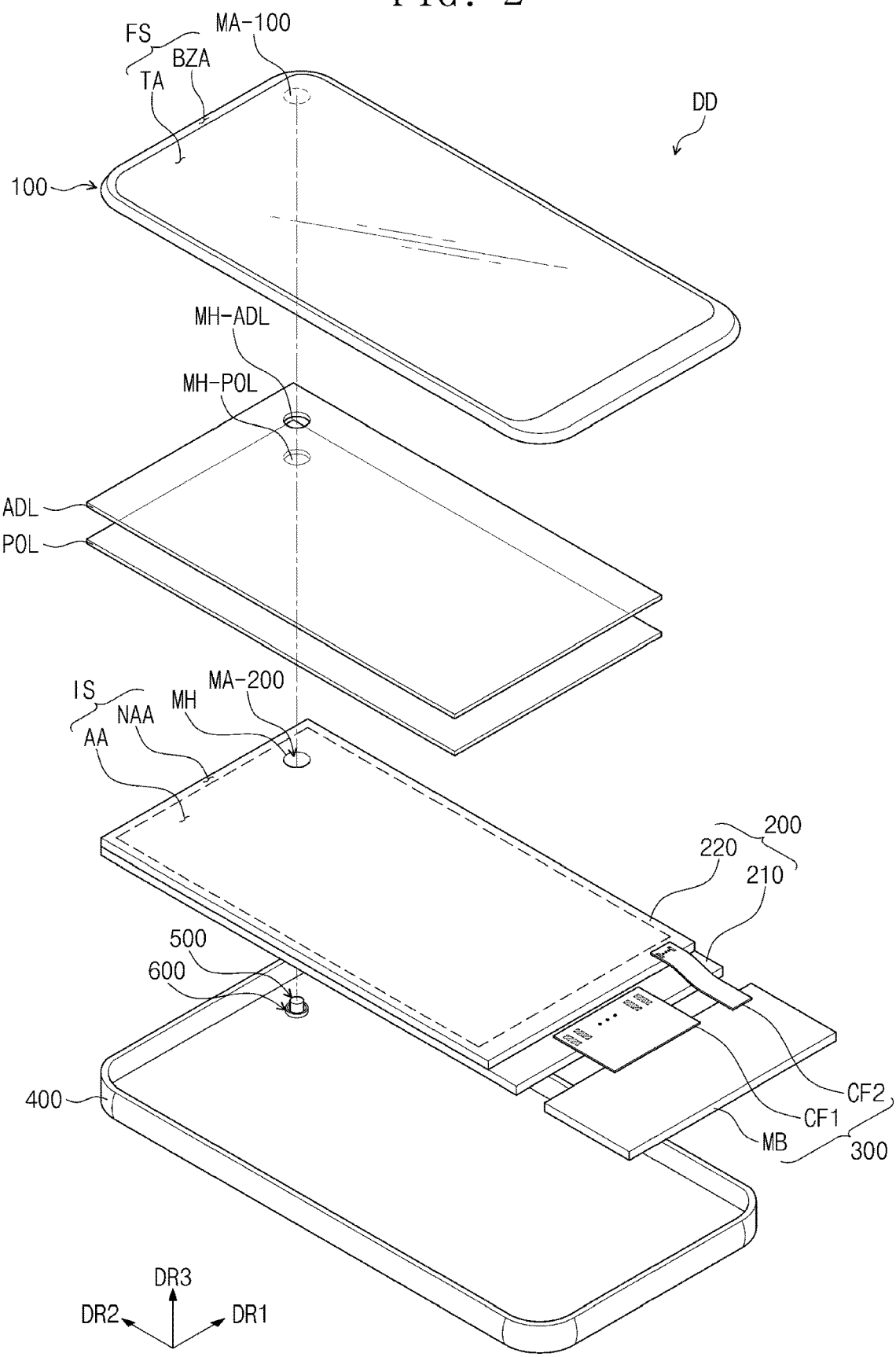
FIG. 2 is an exploded perspective view illustrating a display device according to an embodiment of the inventive concepts.
Figure 3:
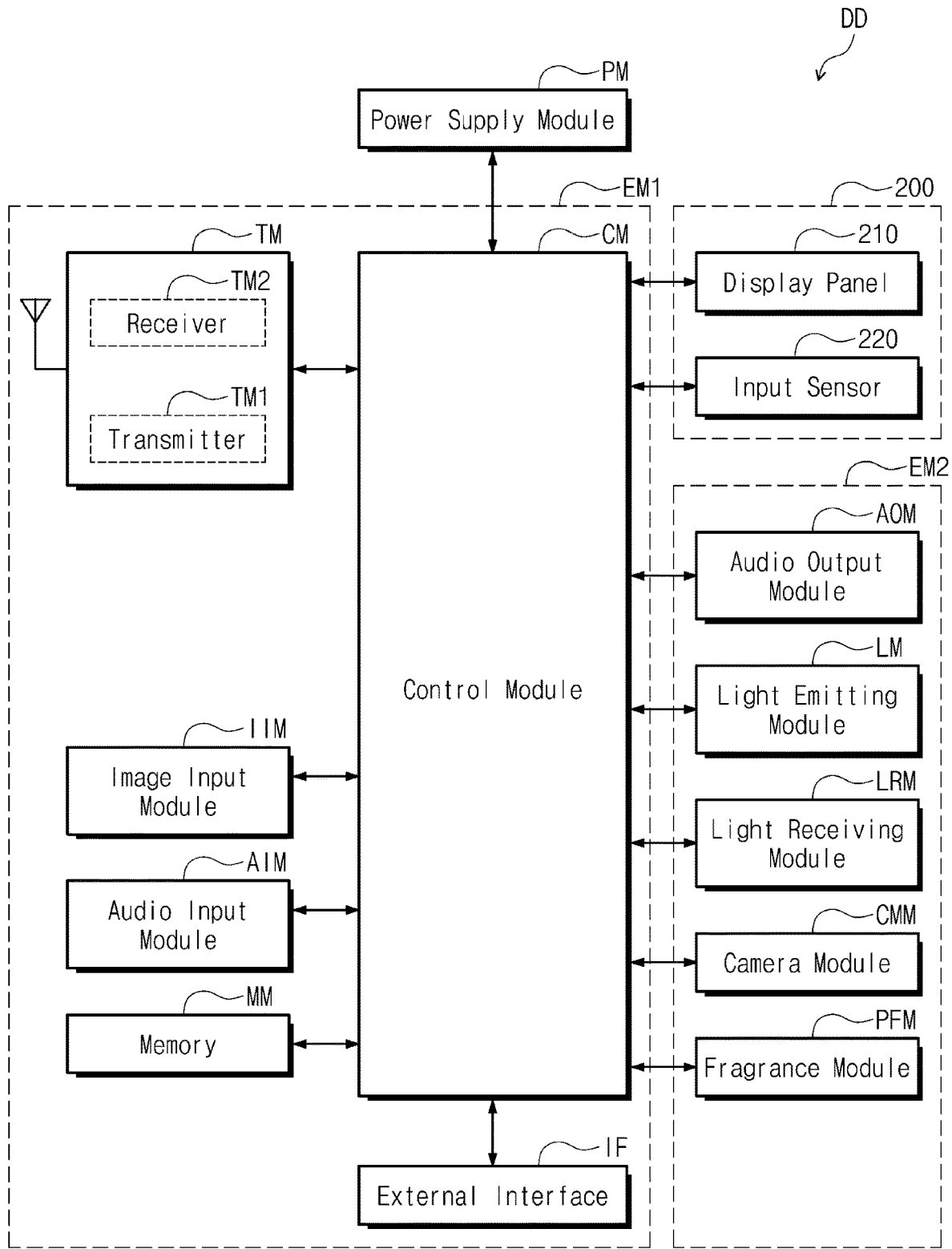
FIG. 3 is a block diagram illustrating a display device according to an embodiment of the inventive concepts.

FIG. 1 is a perspective view illustrating the display device DD according to an embodiment of the inventive concepts. FIG. 2 is an exploded perspective view illustrating the display device DD according to an embodiment of the inventive concepts. FIG. 3 is a block diagram illustrating the display device DD according to an embodiment of the inventive concepts.

Referring to FIGS. 1 to 3, the display device DD may be activated in response to electrical signals to display an image IM. The display device DD may be a computer (e.g., a tablet computer, a note computer), or a television.

In the display device DD, a display surface FS through which the image IM is displayed may be substantially parallel to a surface defined by a first direction DR1 and a second direction DR2. A normal line direction of the display surface FS, i.e., a thickness direction of the display device DD, may indicate a third direction DR3. The display surface FS may correspond to a front surface of the display device DD and a front surface of a window 100. Hereinafter, the display surface FS, the front surface of the display device DD and the front surface of the window 100 will be assigned with the same reference numeral. The image IM may include a video and a still image. FIG. 1 illustrates a clock widget and application icons as a representative example of the image IM.

In the present embodiment, front (or upper) and rear (or lower) surfaces of each member of the display device DD may be defined with respect to a direction in which the image IM is displayed. The front and rear surfaces may be opposite to each other in the third direction DR3.

The display device DD may include the window 100, a display module 200, a driving circuit unit 300, a housing 400, an electronic module 500, and a fragrance cartridge 600. In the present embodiment, the window 100 and the housing 400 may be coupled to each other to form an exterior of the display device DD. The display module 200 may include a display panel 210 and an input sensor 220. The display panel 210 may include a display area displaying the image IM and a non-display area defined adjacent to the display area. The display area of the display panel 210 may correspond to an active area AA of the display module 200, and the non-display area of the display panel 210 may correspond to a non-active area NAA of the display module 200. The window 100 may be disposed on the display panel 210, and the input sensor 220 may be disposed between the display panel 210 and the window 100.

An adhesive layer ADL and an anti-reflective layer POL may be disposed between the window 100 and the display module 200. The adhesive layer ADL may be an optically transparent adhesive layer, however, it should not be limited thereto or thereby. According to an embodiment, the anti-reflective layer POL may include a linear polarization layer and at least one retarder layer. The linear polarization layer may be an optical layer that linearly polarizes a light incident thereto in one direction. The retarder layer may be a $\lambda/2$ retarder layer or a $\lambda/4$ retarder layer. The anti-reflective layer POL may reduce a reflective phenomenon of an external light.

The window 100 may include an optically transparent insulating material. For example, the window 100 may include glass or plastic. The window 100 may have a single-layer or multi-layer structure. For example, the window 100 may include a plurality of plastic films attached to each other by an adhesive or may include a glass substrate and a plastic film attached to the glass substrate by an adhesive.

The window 100 may be divided into a transmission area TA and a bezel area BZA in a plane. The transmission area TA may correspond to the display area, and the bezel area BZA may correspond to the non-display area. In the following descriptions, the expression "when viewed in a plane" or "in a plane" may mean a state of being viewed in the third direction DR3. In addition, the "thickness direction" may mean the third direction DR3.

The transmission area TA may be an optically transparent area. The bezel area BZA may have a light transmittance that is relatively lower than that of the transmission area TA. The bezel area BZA may define a shape of the transmission area TA. The bezel area BZA may be disposed adjacent to the transmission area TA and may surround the transmission area TA.

The bezel area BZA may have a predetermined color. The bezel area BZA may cover the non-active area NAA of the display module 200 to prevent the non-active area NAA from being viewed from the outside. However, this is merely one example, and the bezel area BZA may be omitted from the window 100 according to an embodiment of the inventive concepts.

According to an embodiment, a functional area MA may overlap the electronic module 500 and the fragrance cartridge 600 described later. The display device DD may receive an external signal for the electronic module 500 via the functional area MA or may output signals from the electronic module 500 to the outside. In addition, the display device DD may provide scent particles dispersed from the fragrance cartridge 600 via the functional area MA. According to the inventive concepts, the functional area MA may be defined to overlap the transmission area TA.

FIG. 1 illustrates one functional area MA, however, the number of the functional areas MA should not be limited to one. According to an embodiment, the display device DD may include two or more functional areas MA. In addition, the functional area MA defined at a right upper end of the transmission area TA is illustrated as a representative example, however, the functional area MA may be defined in various positions, such as a left upper end of the transmission area TA, a center of the transmission area TA, a left lower end of the transmission area TA, or a right lower end of the transmission area TA.

Referring to FIGS. 1 and 2, a first functional area MA-100 may be defined in the window 100 to correspond to the functional area MA, and a second functional area MA-200 may be defined in the display module 200 to correspond to the functional area MA. The first functional area MA-100 may overlap the second functional area MA-200 in the third direction DR3.

The display module 200 may be disposed under the window 100. The term "under" may mean a direction opposite to the direction in which the display module 200 provides the image. The display module 200 may display the image IM and may sense an external input TC. The display module 200 may include a front surface IS including the active area AA and the non-active area NAA. The active area AA may be activated in response to electrical signals.

According to an embodiment, the active area AA may be an area through which the image IM is displayed and, substantially simultaneously, the external input TC is sensed. The transmission area TA may overlap at least the active area AA. As an example, the transmission area TA may overlap all or at least a portion of the active area AA. Accordingly, a user may perceive the image IM or may provide the external input TC via the transmission area TA.

The non-active area NAA may be covered by the bezel area BZA. The non-active area NAA may be defined adjacent to the active area AA and may surround the active area AA. A driving circuit or a driving line to drive the active area AA may be disposed in the non-active area NAA.

According to an embodiment, the display module 200 may be in a flat state in the active area AA and the non-active area NAA, however, it should not be limited thereto or thereby. As an example, the display module 200 may be partially bent in the non-active area NAA. In this case, the display module 200 may be bent toward a rear surface of the display device DD in the non-active area NAA, and thus, a size of the bezel area BZA is reduced in the front surface of the display device DD. According to an embodiment, the display module 200 may have a partially-bent shape in the active area AA. In addition, according to an embodiment, the non-active area NAA may be omitted from the display module 200.

The display module 200 may include the display panel 210 and the input sensor 220.

The display panel 210 may include a configuration that substantially generates the image IM. The image IM generated by the display panel 210 may be displayed through the front surface IS of the display module 200 and may be viewed by the user from the outside through the transmission area TA.

The input sensor 220 may sense the external input TC provided from the outside. For example, the input sensor 220 may sense the external input TC provided through the window 100. The external input TC may be a user input. The user input may include various forms of external inputs, such as a portion of the user's body, light, heat, pen, or pressure. According to the present embodiment, a touch operation using the user's hand applied via the front surface FS of the display device DD is illustrated as a representative example of the external input TC, however, this is merely one example. As described above, the external input TC may be provided in various forms, the input sensor 220 may sense the external input TC applied to a side or rear surface of the display device DD depending on a structure of the display device DD, and the input sensor 220 should not be limited to a particular embodiment.

The driving circuit unit 300 may be electrically connected to the display panel 210 and the input sensor 220. The driving circuit unit 300 may include a main circuit board MB, a first flexible film CF1, and a second flexible film CF2.

The first flexible film CF1 may be electrically connected to the display panel 210. The first flexible film CF1 may connect the display panel 210 to the main circuit board MB. The first flexible film CF1 may be connected to pads (display pads) of the display panel 210, which are disposed in the non-active area NAA. The first flexible film CF1 may apply electrical signals to the display panel 210 to drive the display panel 210. The electrical signals may be generated by the first flexible film CF1 or the main circuit board MB.

The second flexible film CF2 may be electrically connected to the input sensor 220. The second flexible film CF2 may connect the input sensor 220 to the main circuit board MB. The second flexible film CF2 may be connected to pads (sensing pads) of the input sensor 220, which are disposed in the non-active area NAA. The second flexible film CF2 may apply electrical signals to the input sensor 220 to drive the input sensor 220. The electrical signals may be generated by the second flexible film CF2 or the main circuit board MB.

The main circuit board MB may include various driving circuits used to drive the display module 200 or a connector used to supply a power. The first flexible film CF1 and the second flexible film CF2 may be connected to the main circuit board MB. According to an embodiment, the display module 200 may be easily controlled by using one main circuit board MB, however, this is merely one example. According to an embodiment, the display panel 210 and the input sensor 220, which are included in the display module 200, may be connected to different main circuit boards from each other, one of the first flexible film CF1 and the second flexible film CF2 may not be connected to the main circuit board MB, and they should not be particularly limited.

According to an embodiment, an area of the display module 200, which corresponds to the second functional area MA-200, may have a relatively high transmittance when compared with a transmittance of the active area AA that does not overlap the second functional area MA-200. As an example, at least a portion of each component of the display panel 210 and each component of the input sensor 220 may be removed. Accordingly, the electronic module 500 disposed to overlap the second functional area MA-200 may easily transmit and/or receive signals through the first and second functional areas MA-100 and MA-200.

In FIG. 2, a predetermined hole MH (hereinafter, referred to as a module hole) may be defined in an area of the display module 200, which corresponds to the second functional area MA-200. The module hole MH may be defined in the active area AA to penetrate through the display module 200. The display panel 210 and the input sensor 220 may be penetrated by the module hole MH. That is, the module hole MH may be defined by removing the portion of each of the components of the display panel 210 and the portion of each of the components of the input sensor 220, which are disposed to overlap the second functional area MA-200. As the module hole MH is defined in the active area AA, the functional area MA (refer to FIG. 1) may be provided in the transmission area TA.

A predetermined hole may be defined through the adhesive layer ADL and the anti-reflective layer POL to correspond to the functional area MA (refer to FIG. 1). As an example, a first functional hole MH-ADL may be defined through the adhesive layer ADL, and a second functional hole MH-POL may be defined through the anti-reflective layer POL. The first functional hole MH-ADL and the second functional hole MH-POL may overlap the functional area MA (refer to FIG. 1).

When viewed in a plane, the electronic module 500 and the fragrance cartridge 600 may overlap the module hole MH, the first functional hole MH-ADL, the second functional hole MH-POL, and the functional area MA (refer to FIG. 1). Each of the electronic module 500 and the fragrance cartridge 600 may be disposed under the display module 200. The electronic module 500 and the fragrance cartridge 600 may be accommodated in the module hole MH.

In more detail, the electronic module 500 may be disposed under the window 100 and the display panel 210 and may overlap a signal transmission area STA described later with reference to FIGS. 5A and 5B. The electronic module 500 may receive the external input transmitted through the first and second functional areas MA-100 and MA-200 or may provide outputs through the functional area MA (refer to FIG. 1). The electronic module 500 may include a camera module, an infrared ray sensor, or a photosensor.

Figure 5A:
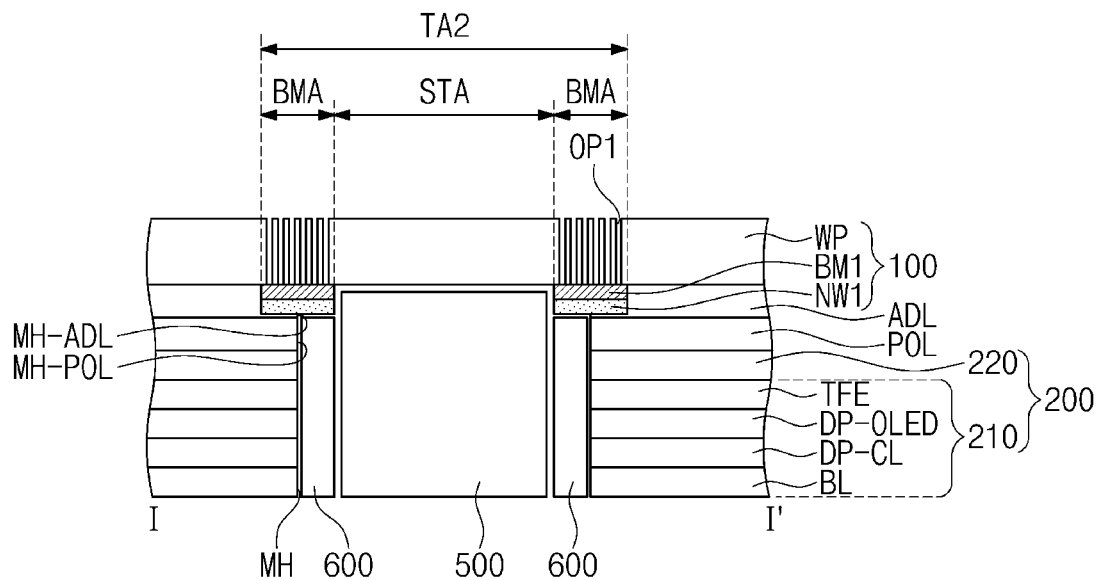
FIGS. 5A and 5B are cross-sectional views taken along a line I-I' of FIG. 1.
Figure 5B:
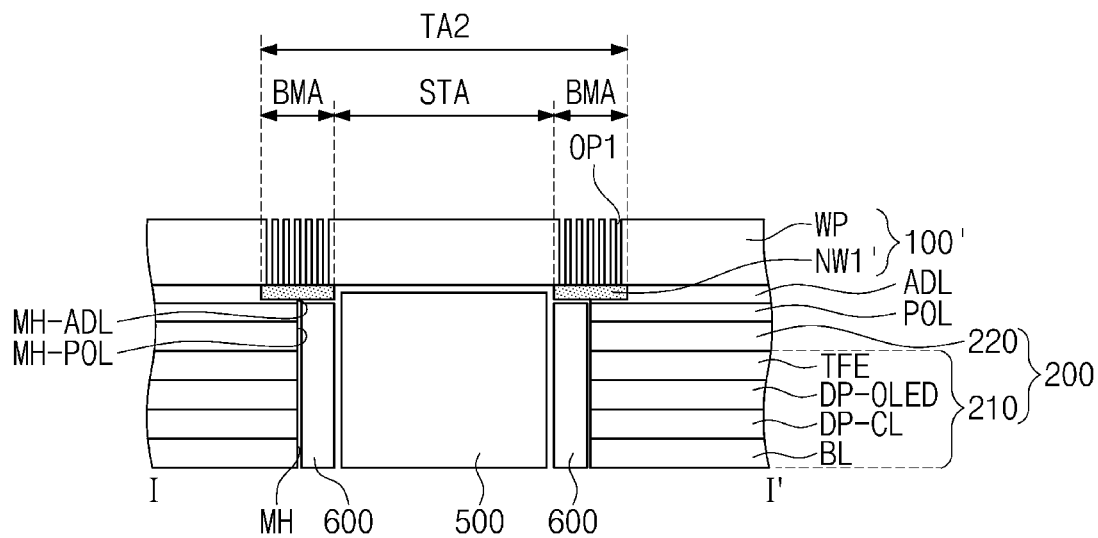

In more detail, the fragrance cartridge 600 may be disposed under the window 100 and the display panel 210 and may overlap a light blocking pattern area BMA (refer to FIGS. 5A and 5B). At least a portion of the fragrance cartridge 600 may surround the electronic module 500. The fragrance cartridge 600 may provide the scent particles to the outside through the functional area MA (refer to FIG. 1). As an example, the fragrance cartridge 600 may provide the scent particles to the front surface FS of the window 100 or the user.

The fragrance cartridge 600 may include the scent particles, such as perfume particles or alcohol particles. The fragrance cartridge 600 may include a sheet including the scent particles. The scent particles of the fragrance cartridge 600 may be dispersed out of the window 100 via fine openings (e.g., fine holes) defined through the window 100. This will be described in detail later.

The housing 400 may be coupled with the window 100. The housing 400 may be coupled with the window 100 to provide an inner space. The display module 200 and the electronic module 500 may be accommodated in the inner space.

The housing 400 may include a material with a relatively high rigidity. For example, the housing 400 may include a plurality of frames and/or plates containing glass, plastic, metal, or a combination thereof. The housing 400 may stably protect the components of the display device DD, which are accommodated in the inner space, from external impacts.

Referring to FIG. 3, the display device DD may include the display module 200, a power supply module PM, a first electronic module EM1, and a second electronic module EM2. The display module 200, the power supply module PM, the first electronic module EM1, and the second electronic module EM2 may be electrically connected to each other.

The power supply module PM may supply a power source used for an overall operation of the display device DD. The power supply module PM may include a normal battery module.

The first electronic module EM1 and the second electronic module EM2 may include a variety of functional modules to drive the display device DD.

The first electronic module EM1 may be mounted directly on a mother board electrically connected to the display module 200 or may be electrically connected to the mother board via a connector (not illustrated) after being mounted on a separate substrate.

The first electronic module EM1 may include a control module CM, a wireless communication module TM, an image input module IIM, an audio input module AIM, a memory MM, and an external interface IF. Some modules among the modules may be electrically connected to the mother board through a flexible circuit board without being mounted on the mother board.

The control module CM may control an overall operation of the display device DD. The control module CM may be a microprocessor. The control module CM may activate or deactivate the display module 200. The control module CM may control other modules, such as the image input module IIM or the audio input module AIM, based on a touch signal provided from the display module 200.

The wireless communication module TM may transmit/receive a wireless signal to/from other terminals using a Bluetooth or WiFi link. The wireless communication module TM may transmit/receive a voice signal using a general communication line. The wireless communication module TM may include a transmitter TM1 that modulates a signal to be transmitted and transmits the modulated signal and a receiver TM2 that demodulates a signal applied thereto.

The image input module IIM may process an image signal and may convert the image signal into image data that may be displayed through the display module 200. The audio input module AIM may receive an external sound signal through a microphone in a record mode or a voice recognition mode and may convert the external sound signal to electrical voice data.

The external interface IF may serve as an interface between the control module CM and external devices, such as an external charger, a wired/wireless data port, a card socket used for e.g., a memory card and a SIM/UIM card, etc.

The second electronic module EM2 may include an audio output module AOM, a light emitting module LM, a light receiving module LRM, a camera module CMM, and a fragrance module PFM. The modules may be mounted directly on the mother board, may be electrically connected to the display module 200 through a connector (not illustrated) after being mounted on a separate substrate, or may be electrically connected to the first electronic module EM1.

The audio output module AOM may convert audio data provided from the wireless communication module TM or audio data stored in the memory MM and may output the converted audio data to the outside.

The light emitting module LM may generate a light and may output the light. The light emitting module LM may emit an infrared ray. The light emitting module LM may include an LED element. The light receiving module LRM may sense the infrared ray. The light receiving module LRM may be activated when the infrared ray having a predetermined level or higher is sensed. The light receiving module LRM may include a complementary metal oxide semiconductor (CMOS) sensor. The infrared ray generated by and output from the light emitting module LM may be reflected by an external object, e.g., a user's finger or face, and the reflected infrared ray may be incident into the light receiving module LRM. The camera module CMM may take an image of an external object.

According to an embodiment, with reference to FIGS. 2 and 3, the electronic module 500 may include at least one of the components of the first electronic module EM1 and the second electronic module EM2. As an example, the electronic module 500 may include at least one of the audio output module AOM, the light emitting module LM, the light receiving module LRM, the camera module CMM, and a heat sensing module. In more detail, the electronic module 500 may sense an external input provided through the first and second functional areas MA-100 and MA-200 or may provide the sound signal such as a voice or the light such as the infrared ray to the outside. In addition, the electronic module 500 may include a plurality of modules, and it should not be particularly limited.

The fragrance module PFM may provide the scent particles to the user using the fragrance cartridge 600. In detail, the fragrance module PFM may provide the scent particles to the outside of the window 100 through the fragrance cartridge 600. The fragrance module PFM may provide the scent particles to the outside through openings OP1 and OP2 (refer to FIG. 8B) of the window 100 described later. The fragrance module PFM may control the activation of the fragrance cartridge 600.

Figure 4:
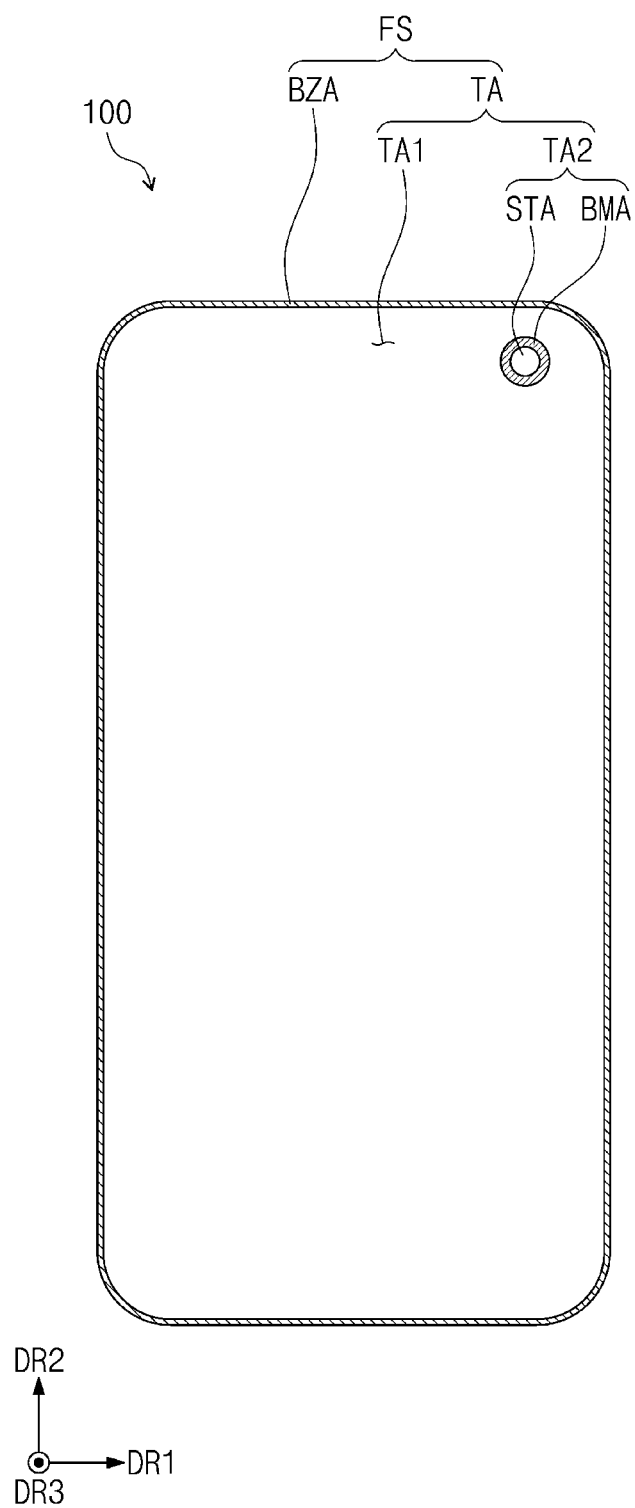
FIG. 4 is a plan view illustrating a window according to an embodiment of the inventive concepts.

FIG. 4 is a plan view illustrating the window 100 according to an embodiment of the inventive concepts. FIGS. 5A and 5B are cross-sectional views taken along a line I-I' of FIG. 1.

Referring to FIG. 4, the front surface FS of the window 100 may be divided into the transmission area TA and the bezel area BZA. Descriptions of the transmission area TA and the bezel area BZA are the same as the details thereof described above.

The transmission area TA may include a first sub-area TA1 and a second sub-area TA2. The second sub-area TA2 may correspond to the first functional area MA-100 illustrated in FIG. 2. The first sub-area TA1 may surround the second sub-area TA2 and may transmit images. The second sub-area TA2 may be an area through which the images are not transmitted. The second sub-area TA2 may include the signal transmission area STA and the light blocking pattern area BMA that is a peripheral area defined adjacent to the signal transmission area STA.

FIGS. 5A and 5B are cross-sectional views illustrating the functional area MA (refer to FIG. 1) of the display device DD (refer to FIG. 1).

According to an embodiment, the adhesive layer ADL, the anti-reflective layer POL, and the display module 200 may be disposed under the window 100.

The display module 200 may include the display panel 210 and the input sensor 220.

The display panel 210 may include a base layer BL, a circuit element layer DP-CL disposed on the base layer BL, a display element layer DP-OLED disposed on the circuit element layer DP-CL, and an encapsulation layer TFE.

The base layer BL may include a glass substrate or a synthetic resin substrate. In addition, the base layer BL may include a substrate having a substantially uniform refractive index in a visible light wavelength range. The circuit element layer DP-CL may include at least one insulating layer and a circuit element. The circuit element layer DP-CL may include at least one transistor. The insulating layer of the circuit element layer DP-CL may include at least one inorganic layer and/or at least one organic layer. The circuit element may include a signal line and a pixel driving circuit. The display element layer DP-OLED may include at least one light emitting element. The display element layer DP-OLED may include organic light emitting diodes as the light emitting element. The display element layer DP-OLED may include a pixel definition layer including, for example, an organic material.

The encapsulation layer TFE may encapsulate the display element layer DP-OLED. The encapsulation layer TFE may include at least one insulating layer. According to an embodiment, the encapsulation layer TFE may include at least one inorganic layer (hereinafter, referred to as an encapsulation inorganic layer). According to an embodiment, the encapsulation layer TFE may include at least one organic layer (hereinafter, referred to as an encapsulation organic layer) and at least one encapsulation inorganic layer. The encapsulation inorganic layer may protect the display element layer DP-OLED from moisture and oxygen, and the encapsulation organic layer may protect the display element layer DP-OLED from a foreign substance such as dust particles. The encapsulation inorganic layer may include a silicon nitride layer, a silicon oxynitride layer, a silicon oxide layer, a titanium oxide layer, or an aluminum oxide layer, however, it should not be limited thereto or thereby. The encapsulation organic layer may include an acrylic-based organic layer, however, it should not be limited thereto or thereby.

The input sensor 220 may be disposed on the display panel 210. As an example, the input sensor 220 may be disposed directly on the display panel 210 or may be coupled with the display panel 210 by an adhesive member. The input sensor 220 may be formed on the display panel 210 through successive processes after the display panel 210 is formed.

The display panel 210 and the input sensor 220 may be provided with the module hole MH defined therethrough.

Descriptions of the adhesive layer ADL and the anti-reflective layer POL are the same as the details thereof described above.

The window 100 may include a window base WP and a first nanofiber NW1.

According to an embodiment, the window base WP may be a transparent substrate such as a glass substrate, however, it should not be limited thereto or thereby. According to an embodiment, the window base WP may include a synthetic resin.

According to an embodiment, the window base WP may include a first area, a second area, a third area, and a fourth area. The first, second, third, and fourth areas of the window base WP may respectively correspond to areas of the window 100. As an example, the first area may correspond to the signal transmission area STA of the window 100, and the second area may correspond to the light blocking pattern area BMA. The third area may correspond to the first sub-area TA1 (refer to FIG. 4), and the fourth area may correspond to the bezel area BZA (refer to FIG. 4). Accordingly, the second area may surround the first area, the third area may surround the second area, and the fourth area may surround the third area when viewed in a plane.

The window base WP may be provided with a plurality of first openings OP1. The first openings OP1 may overlap the light blocking pattern area BMA. The first openings OP1 may be fine holes formed by processing the window base WP using a laser beam. In an embodiment, the second area may be provided with the plurality of first openings OP1 defined therein.

The first openings OP1 may be exposed to the outside. The scent particles of the fragrance cartridge 600 (refer to FIG. 1) may be dispersed out of the window 100 through the first openings OP1.

The window 100 may include the first nanofiber NW1 disposed under the window base WP to overlap the first openings OP1. The first nanofiber NW1 may overlap the light blocking pattern area BMA. The first nanofiber NW1 may be an ultrafine fiber, for example, a nano-membrane. Pores of the first nanofiber NW1 may have a diameter equal to or smaller than about 300 μm and accordingly, the first nanofiber NW1 may have a waterproof property. That is, large particles such as water droplets may not pass through the first nanofiber NW1, however, small particles or gases such as scent particles may pass through the first nanofiber NW1.

As the window 100 includes the first nanofiber NW1 disposed under the window base WP through which the first openings OP1 are defined, to overlap the first openings OP1, the window 100 may have a superior waterproof property. Meanwhile, the scent particles dispersed from the fragrance cartridge 600 may pass through the first nanofiber NW1.

Accordingly, the window 100 that includes the window base WP through which the first openings OP1 are defined may maintain the waterproof property while providing the scent particles to the user outside the display device DD.

According to an embodiment, the window 100 may further include a first light blocking pattern BM1 disposed between the window base WP and the first nanofiber NW1. In an embodiment, the first light blocking pattern BM1 may be disposed under the window base WP and overlapping the second area. The first light blocking pattern BM1 may include a light blocking material such as a black matrix. The first light blocking pattern BM1 may be disposed in the light blocking pattern area BMA of the transmission area TA (refer to FIG. 4). The first light blocking pattern BM1 may be disposed only in the light blocking pattern area BMA and may not overlap the signal transmission area STA. In other words, in an embodiment, the first light blocking pattern BM1 may overlap only the second area. The signal transmission area STA may be defined inside the first light blocking pattern BM1.

The light blocking pattern area BMA may overlap the first light blocking pattern BM1, the first nanofiber NW1, and the first openings OP1. The light blocking pattern area BMA may be an area that provides the scent particles to the user while improving aesthetics of the window 100.

According to an embodiment, the module hole MH, the first functional hole MH-ADL, and the second functional hole MH-POL may overlap the signal transmission area STA and at least a portion of the light blocking pattern area BMA.

The electronic module 500 and the fragrance cartridge 600 may be disposed in the module hole MH, the first functional hole MH-ADL, and the second functional hole MH-POL. In detail, the electronic module 500 may be disposed under the window 100 and may overlap the signal transmission area STA. The fragrance cartridge 600 may be disposed under the window 100 and may overlap at least the portion of the light blocking pattern area BMA.

Referring to FIG. 5B, a window 100' may not include a separate light blocking pattern. Alternatively, a first nanofiber NW1' may include a light blocking material such as a black matrix. As the first nanofiber NW1' is disposed in the light blocking pattern area BMA, the light blocking pattern area BMA may maintain a light blocking function and a waterproof function. In addition, because the window 100' does not include the separate light blocking pattern, the display device may be slimmed. Descriptions on other components of the window 100' are the same as the details thereof described with reference to FIG. 5A.

Figure 6A:
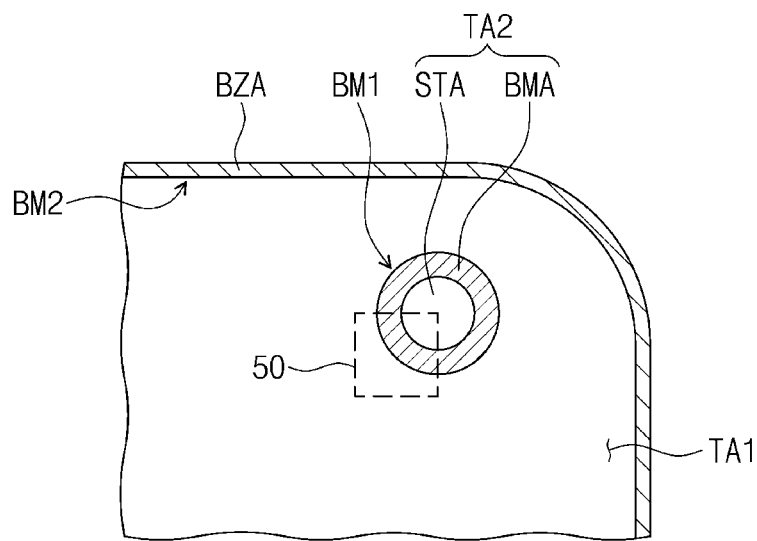
FIG. 6A is a plan view illustrating a portion of a window according to an embodiment of the present disclosure.
Figure 6B:
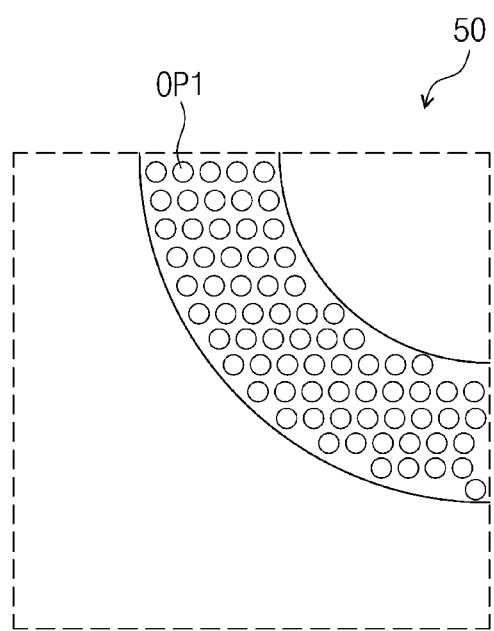
FIG. 6B is a plan view illustrating an area 50 shown in FIG. 6A.
Figure 7:
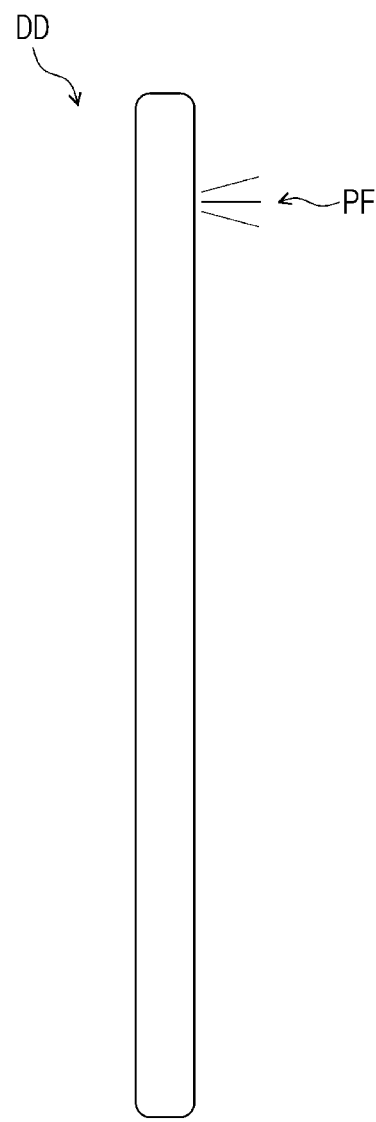
FIG. 7 is a side view illustrating a display device according to an embodiment of the present disclosure.
Figure 7:
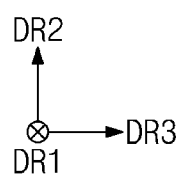

FIG. 6A is a plan view illustrating a portion of the window according to an embodiment of the inventive concepts. FIG. 6B is a plan view illustrating an area 50 illustrated in FIG. 6A. FIG. 7 is a side view illustrating a display device DD according to an embodiment of the inventive concepts.

Referring to FIG. 6A, when viewed in a plane, the light blocking pattern area BMA may overlap the first light blocking pattern BM1, and the bezel area BZA may overlap a second light blocking pattern BM2. In an embodiment, the second light blocking pattern BM2 may be disposed under the window base WP and overlapping the fourth area. The second light blocking pattern BM2 may include the light blocking material such as the black matrix. According to an embodiment, the second light blocking pattern BM2 may include the same material as that of the first light blocking pattern BM1. Descriptions on other components are the same as the details thereof described above.

FIG. 6B is an enlarged view illustrating the area 50 that is a portion of the light blocking pattern area BMA. The light blocking pattern area BMA may be provided with the first openings OP1 defined therein. Referring to FIGS. 4 and 6B, the first openings OP1 may be exposed to the front surface FS of the window 100.

Referring to FIGS. 6B and 7, as the first openings OP1 are exposed to the outside, a fragrance PF may be dispersed out of the display device DD through the first openings OP1. The fragrance PF may be an example of the scent particles dispersed from the fragrance cartridge 600 (refer to FIGS. 5A or 5B), however, embodiments should not be limited thereto or thereby. According to an embodiment, alcohol may be vaporized from the fragrance cartridge 600 and may be dispersed out of the display device DD.

Figure 8A:
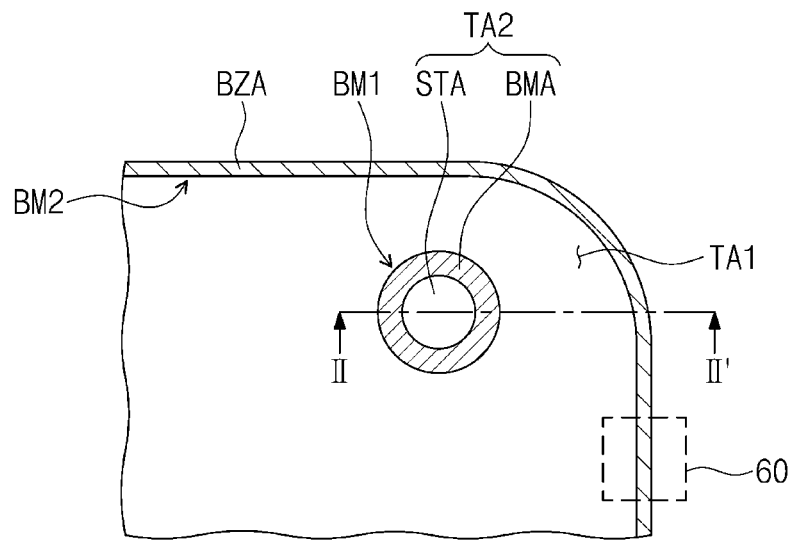
FIG. 8A is a plan view illustrating a portion of a window according to an embodiment of the present disclosure.
Figure 8B:
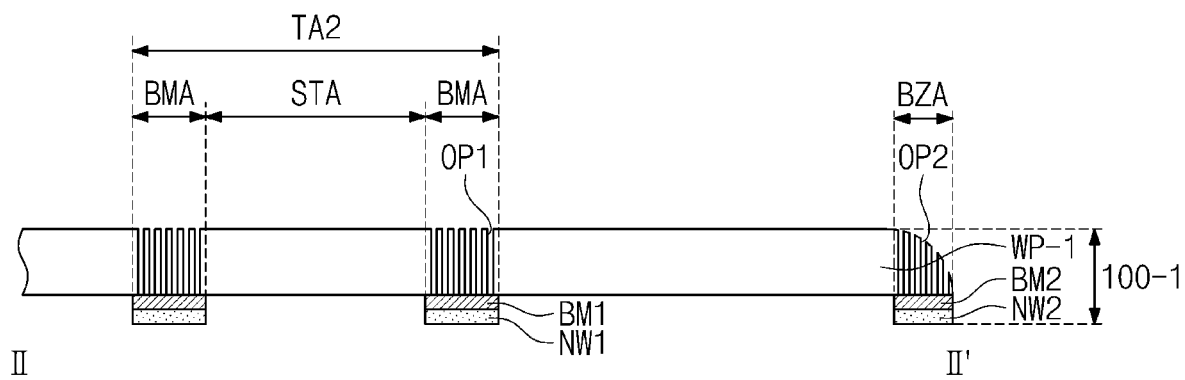
FIGS. 8B and 8C are cross-sectional views taken along a line II-IF of FIG. 8A.
Figure 8C:
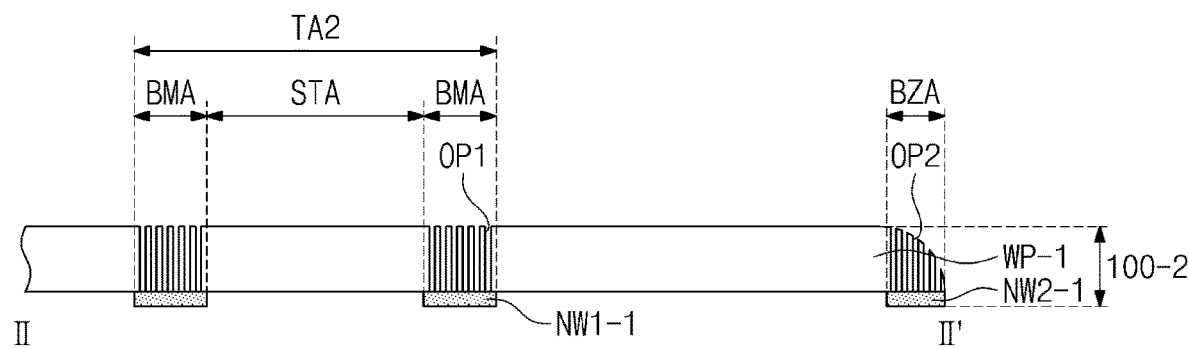
Figure 8D:
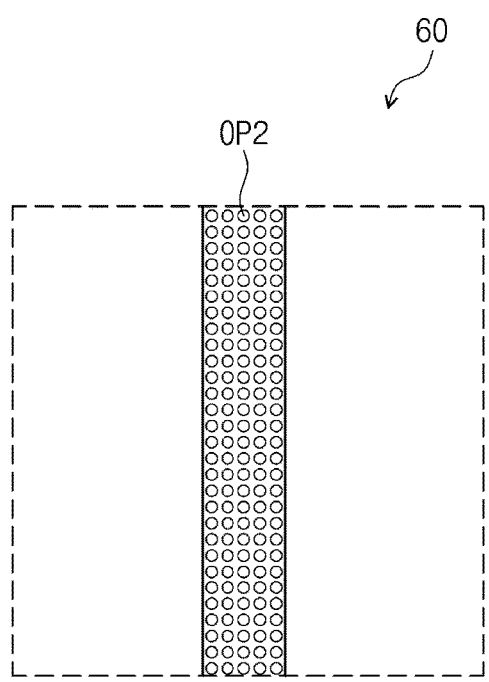
FIG. 8D is a plan view illustrating an area 60 shown in FIG. 8A.
Figure 9:
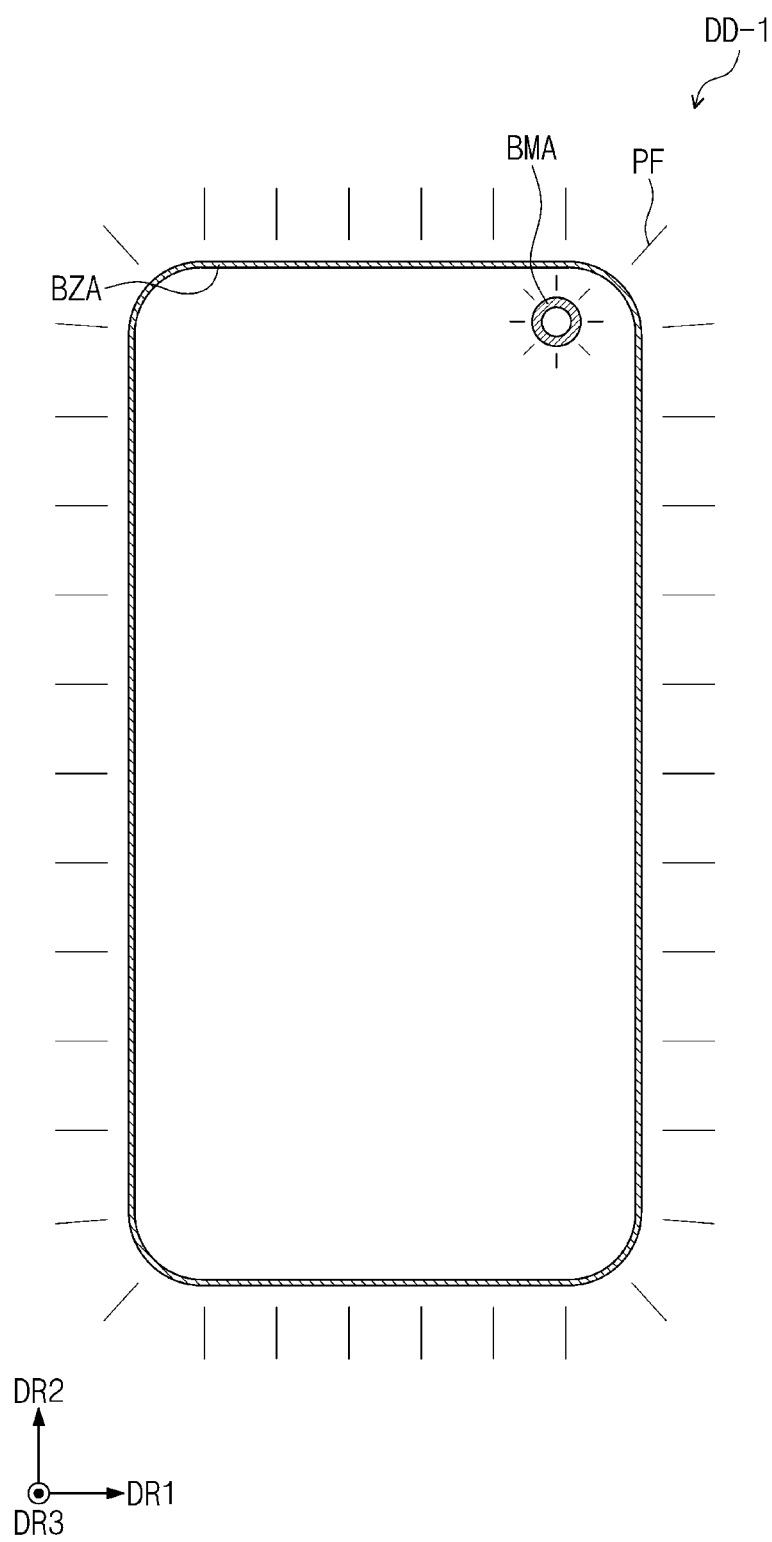
FIG. 9 is a plan view illustrating a display device according to an embodiment of the present disclosure.

FIG. 8A is a plan view illustrating a portion of a window according to an embodiment of the inventive concepts. FIGS. 8B and 8C are cross-sectional views taken along a line II-IF of FIG. 8A. FIG. 8D is a plan view illustrating an area 60 illustrated in FIG. 8A. FIG. 9 is a plan view illustrating a display device according to an embodiment of the inventive concepts. Details on the same components described with reference to FIGS. 1 to 7 are the same as the details thereof in FIGS. 8A to 8D and 9.

Referring to FIGS. 8A and 8B, a plurality of second openings OP2 may be defined through a window base WP-1. The second openings OP2 may be fine holes formed by processing the window base WP-1 using a laser beam. The window base WP-1 may be provided with a plurality of first openings OP1 and the plurality of second openings OP2. The first openings OP1 may overlap a light blocking pattern area BMA, and the second openings OP2 may overlap a bezel area BZA. In other words, in an embodiment, the fourth area may be provided with the plurality of second openings OP2 defined therein.

A second nanofiber NW2 may be disposed under the window base WP-1 to overlap the second openings OP2. In other words, in an embodiment, a second nanofiber NW2 may be disposed under the window base WP-1 and overlapping the fourth area. Because the window 100-1 includes the second nanofiber NW2 disposed under the window base WP-1, external water droplets may be prevented from entering a lower portion of the window 100-1 via the second openings OP2. The second nanofiber NW2 may be, for example, a nano membrane, and may include the same material as the first nanofiber NW1.

A second light blocking pattern BM2 may be disposed between the window base WP-1 and the second nanofiber NW2. That is, the second light blocking pattern BM2, the second openings OP2, and the second nanofiber NW2 may be disposed in the bezel area BZA. In other words, in an embodiment, the second light blocking pattern BM2 may be disposed under the window base WP-1 and overlapping the fourth area. Accordingly, the bezel area BZA may have a light blocking function and a waterproof function. Although not illustrated in figures, the fragrance cartridge 600 illustrated in FIGS. 5A and 5B may be disposed under the window 100-1 in bezel area BZA. Accordingly, the scent particles may be dispersed out of the window 100-1 through the second openings OP2 in the bezel area BZA, however, embodiments should not be limited thereto or thereby.

Referring to FIG. 8C, a window 100-2 may not include a separate light blocking pattern. Alternatively, a first nanofiber NW1-1 and a second nanofiber NW2-1 may include a light blocking material such as a black matrix. Accordingly, a light blocking pattern area BMA and a bezel area BZA may maintain a light blocking function and a waterproof function. In addition, because the window 100-2 does not include the separate light blocking pattern, the display device may be slimmed.

Referring to FIGS. 8A and 8D, the second openings OP2 may be defined along the bezel area BZA and may be exposed to the outside.

Referring to FIGS. 8D and 9, a display device DD-1 may include a bezel area BZA and a light blocking pattern area BMA in which a fragrance PF is dispersed. The fragrance PF may correspond to the scent particles of the fragrance cartridge 600 (refer to FIG. 5A or 5B) that are dispersed through the first openings OP1 (refer to FIG. 8C) and the second openings OP2. As described above, the fragrance PF may be an example of the scent particles dispersed from the fragrance cartridge 600, however, the embodiment of the scent particles should not be limited thereto or thereby.

According to the inventive concepts, the window may include the window base through which the openings are defined and the nanofiber disposed under the window base to overlap the openings. The display device may include the window and the fragrance cartridge disposed under the window, and the scent particles of the fragrance cartridge may be dispersed out of the display device. In addition, the nanofiber may prevent the foreign substance such as moisture from entering the display device through the openings from the outside of the display device.

Accordingly, the display device may provide the scent particles to the user while maintaining a moisture permeability resistance.

Although the embodiments of the inventive concepts have been described, it is understood that the inventive concepts should not be limited to these embodiments but various changes and modifications can be made by one ordinary skilled in the art within the spirit and scope of the inventive concepts as hereinafter claimed.

Therefore, the disclosed subject matter should not be limited to any single embodiment described herein, and the scope of the present inventive concept shall be determined according to the attached claims.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A window defining a thickness direction and comprising:
    a window base having a first area, a second area surrounding the first area and provided with a plurality of first openings defined therein and extending through the window base in the thickness direction, and a third area surrounding the second area; and
    a first nanofiber disposed under the window base and overlapping the first openings in the thickness direction.

2. The window of claim 1, further comprising:
    a first light blocking pattern disposed under the window base and overlapping the second area.

3. The window of claim 2, wherein the first light blocking pattern overlaps only the second area.

4. The window of claim 2, wherein the first light blocking pattern is disposed between the window base and the first nanofiber.

5. The window of claim 2, wherein the window base further comprises:
    a fourth area surrounding the third area; and
    a second light blocking pattern disposed under the window base and overlapping the fourth area.

6. The window of claim 1, wherein the first nanofiber further comprises:
    a black matrix.

7. The window of claim 1, wherein the window base further comprises:
    a fourth area surrounding the third area and provided with a plurality of second openings defined therein.

8. The window of claim 7, further comprising:
    a second nanofiber disposed under the window base and overlapping the fourth area.

9. The window of claim 8, further comprising:
    a second light blocking pattern disposed under the window base and overlapping the fourth area.

10. A window defining a thickness direction and comprising:
    a window base including a first area, a second area surrounding the first area, a third area surrounding the second area, and a fourth area surrounding the third area; and
    a nanofiber disposed under the window base and overlapping at least one of the second area and the fourth area,
    wherein a plurality of openings is defined in at least one of the second area and the fourth area and extends through the window base in the thickness direction, and the nanofiber overlaps the openings in the thickness direction.

11. The window of claim 10, further comprising a light blocking pattern disposed between the openings and the nanofiber.

12. The window of claim 10, wherein the nanofiber comprises:
a black matrix.

13. An electronic device for providing an image, comprising:
a display panel including a display area in which an image is displayed and a non- display area defined adjacent to the display area; and
a window disposed on the display panel, the window defining a thickness direction and comprising:
a window base having a first area, a second area surrounding the first area and provided with a plurality of first openings defined therein and extending through the window base in the thickness direction, and a third area surrounding the second area; and
a first nanofiber disposed under the window base and overlapping the first openings in the thickness direction.

14. The electronic device of claim 13, further comprising:
a first light blocking pattern disposed under the window base and overlapping the second area.

15. The electronic device of claim 14, wherein the first light blocking pattern is disposed between the window base and the first nanofiber.

16. The electronic device of claim 13, wherein the display panel is provided with a module hole defined in the display area, and the module hole overlaps at least a portion of the second area and the first area.

17. The electronic device of claim 13, further comprising:
a fragrance module disposed under the window, overlapping the second area, and including scent particles.

18. The electronic device of claim 13, further comprising:
an electronic module disposed under the window and overlapping the first area.

19. The electronic device of claim 18, wherein the electronic module is a camera module or an infrared ray sensor.

20. The electronic device of claim 13, wherein the window base further includes a fourth area surrounding the third area and provided with a plurality of second openings defined therein, and the window further includes a second nanofiber disposed under the window base and overlapping the fourth area.

* * * * *